United States Patent
Shimizu et al.

(10) Patent No.: US 11,208,095 B2
(45) Date of Patent: Dec. 28, 2021

(54) CONTROL DEVICE AND CONTROL METHOD FOR VEHICLE

(71) Applicants: JATCO Ltd, Fuji (JP); NISSAN MOTOR CO., LTD., Yokohama (JP)

(72) Inventors: Yutaka Shimizu, Atsugi (JP); Masayoshi Nakasaki, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 158 days.

(21) Appl. No.: 16/636,487

(22) PCT Filed: Jul. 27, 2018

(86) PCT No.: PCT/JP2018/028298
§ 371 (c)(1),
(2) Date: Feb. 4, 2020

(87) PCT Pub. No.: WO2019/031277
PCT Pub. Date: Feb. 14, 2019

(65) Prior Publication Data
US 2020/0238974 A1 Jul. 30, 2020

(30) Foreign Application Priority Data
Aug. 7, 2017 (JP) .............................. JP2017-152497

(51) Int. Cl.
*B60T 7/12* (2006.01)
*B60W 20/40* (2016.01)
*B60W 20/15* (2016.01)

(52) U.S. Cl.
CPC ............ *B60W 20/40* (2013.01); *B60W 20/15* (2016.01)

(58) Field of Classification Search
CPC ..... B60W 20/20; B60W 20/30; B60W 10/115
See application file for complete search history.

(56) References Cited

U.S. PATENT DOCUMENTS

| | | | |
|---|---|---|---|
| 2009/0000839 A1* | 1/2009 | Ishii | B60L 8/003 180/65.51 |
| 2014/0221156 A1 | 8/2014 | Sugimura | |
| 2017/0058895 A1* | 3/2017 | Schultz | F04C 2/102 |
| 2018/0029584 A1* | 2/2018 | Ishikawa | B60K 6/387 |

FOREIGN PATENT DOCUMENTS

| | | |
|---|---|---|
| JP | 2009-292246 A | 12/2009 |
| JP | 2011-063091 A | 3/2011 |
| JP | 2013-023155 A | 2/2013 |
| JP | 2014-148290 A | 8/2014 |
| JP | 2014-234064 A | 12/2014 |

* cited by examiner

*Primary Examiner* — John Kwon
(74) *Attorney, Agent, or Firm* — Foley & Lardner LLP

(57) ABSTRACT

A control device for a vehicle having a drive shaft, an engagement element, an engine connected to the drive shaft via the engagement element, and an electric motor connected to the drive shaft not via the engagement element includes a control portion adapted to stop the engine after a maintaining period in which the engine is maintained at predetermined rotation speed during travel of the vehicle. The a control portion gradually decreases an engagement volume of the engagement element while gradually increasing a power generation load of the electric motor during the maintaining period to disengage the engagement element, and stops the engine after disengagement of the engagement element.

4 Claims, 4 Drawing Sheets

CONTROL DEVICE AND CONTROL METHOD FOR VEHICLE

TECHNICAL FIELD

The present invention relates to control for a vehicle including an engine and an electric motor which serve as power sources.

BACKGROUND ART

JP2014-234064A discloses a hybrid vehicle including an engine and an electric motor connected to a primary pulley of a continuously variable transmission, in which an engine travel mode using motive power of the engine and an electric travel (hereinafter, also called as EV travel) mode using motive power of the electric motor can be selected.

In hybrid vehicles, there is known control to decelerate while performing energy regeneration (hereinafter, also simply called as the "regeneration") at the time of coasting travel during an engine travel mode, and stop an engine during travel. At this time, when fuel injection is stopped in a state where the engine is rotated at high speed and the engine is stopped, an oxygen storage amount in an exhaust catalyst becomes excessive, and there is a possibility that a NOx discharge amount at the time of restart of the engine is increased. In order to suppress this increase in the NOx discharge amount, there is known control to properly correct the oxygen storage amount in the exhaust catalyst by, after rotation speed of the engine is decreased to idle rotation speed, maintaining the rotation speed for a predetermined time, and then stop the engine.

SUMMARY OF INVENTION

As a procedure at the time of stopping the engine during vehicle travel, a procedure to stop the engine after disengaging a lock-up clutch of a torque converter, and start regeneration by an electric motor at the same time as stoppage of the engine is considered. At this time, by disengaging the lock-up clutch, a rotation speed difference (hereinafter, also called as the "differential rotation") between an impeller and a turbine of the torque converter is changed. By this, a fluid load of the torque converter is changed, and torque transmitted to a drive wheel is varied. The torque transmitted to the drive wheel is also varied when negative torque by regeneration is inputted to the drive wheel. The torque variation gives an uncomfortable feeling to a driver.

However, in the above document, there is no description regarding suppression of the torque variation at the time of shifting the engine travel mode to coasting travel accompanied by regeneration.

Thus, an object of the present invention is to suppress torque variation transmitted to a drive wheel at the time of shifting an engine travel mode to coasting travel accompanied by regeneration.

According to one embodiment of this invention, a control device for a vehicle having a drive shaft, an engagement element, an engine connected to the drive shaft via the engagement element, and an electric motor connected to the drive shaft not via the engagement element is provided. The control device comprises a control portion adapted to stop the engine after a maintaining period in which the engine is maintained at predetermined rotation speed during travel of the vehicle. The a control portion gradually decreases an engagement volume of the engagement element while gradually increasing a power generation load of the electric motor during the maintaining period to disengage the engagement element, and stops the engine after disengagement of the engagement element.

According to another embodiment of this invention, a control method for a vehicle having a drive shaft, an engagement element, an engine connected to the drive shaft via the engagement element and an electric motor connected to the drive shaft not via the engagement element is provided. In the control method, the engine is stopped after a maintaining period in which the engine is maintained at predetermined rotation speed during travel of the vehicle. During the maintaining period, an engagement volume of the engagement element is gradually decreased while gradually increasing a power generation load of the electric motor to disengage the engagement element, and stopping the engine after disengagement of the engagement element.

According to the above aspect, by the disengagement of the engagement element, it is possible to remove an influence of a change in a fluid load of a torque converter after the disengagement of the engagement element. Further, by executing the above control, it is possible to suppress an influence of torque variation at the time of disengaging the engagement element. Therefore, it is possible to suppress torque variation transmitted to a drive wheel at the time of shifting an engine travel mode to coasting travel accompanied by regeneration.

DESCRIPTION OF EMBODIMENTS

Hereinafter, an embodiment of the present invention will be described with reference to the attached drawings.

Figure 1:
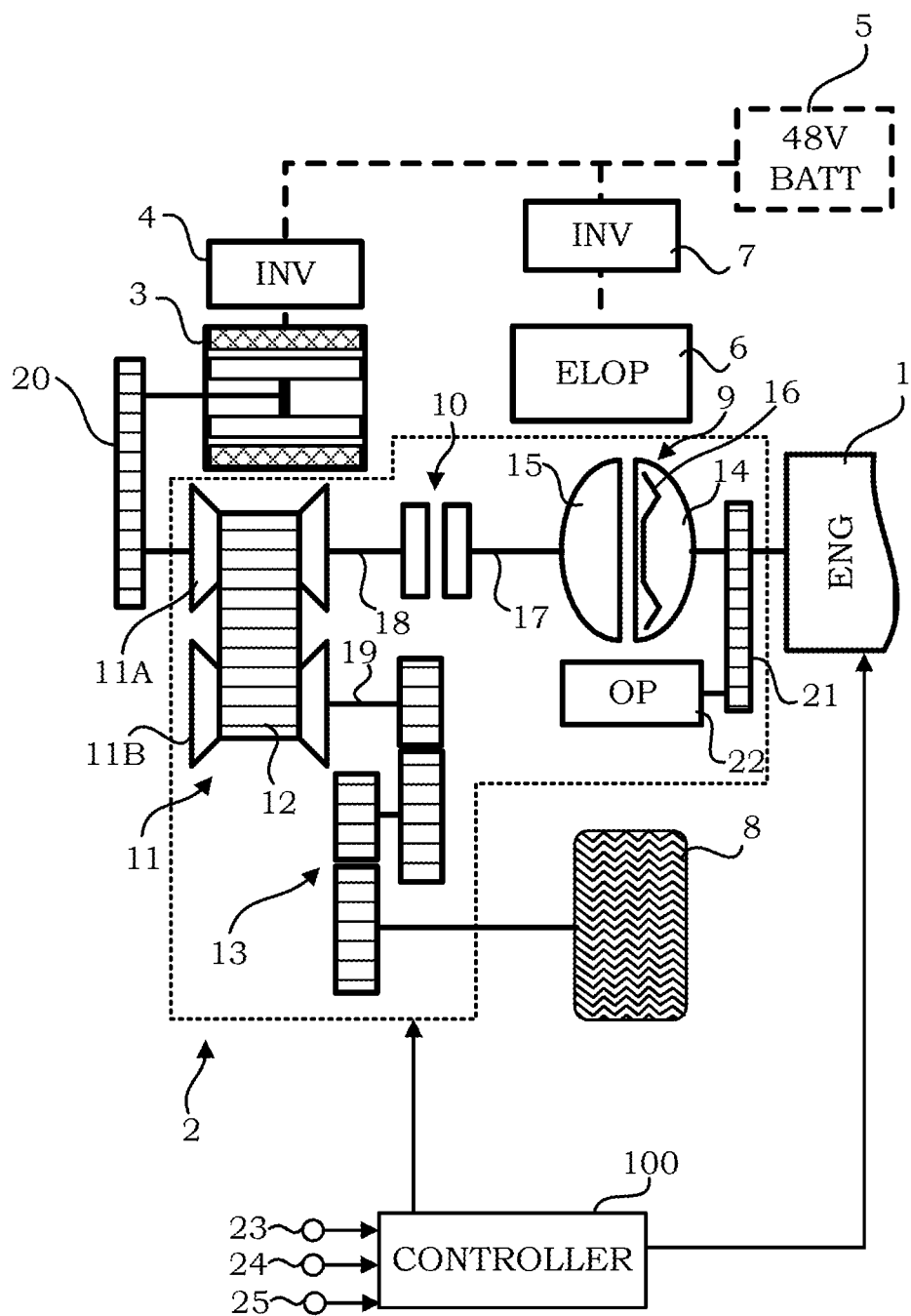
FIG. 1 is a schematic configuration diagram of a vehicle to which the present embodiment is applied.

FIG. 1 is a schematic configuration diagram of a hybrid vehicle (hereinafter, also simply called as the "vehicle") to which the present embodiment is applied. The vehicle includes an engine 1, a continuously variable transmission system 2, a motor generator (hereinafter, also called as the MG) 3, an electric oil pump 6, a drive wheel 8, and a controller 100.

The engine 1 is an internal combustion engine whose fuel is gasoline or diesel oil, and rotation speed, torque, etc. are controlled on the basis of commands from the controller 100.

The continuously variable transmission system 2 includes a torque converter 9, a forward clutch (hereinafter, also called as the Fwd/C) 10 serving as an engagement element, a variator 11, a final gear device 13, and an oil pump 22.

The torque converter 9 includes an impeller 14, a turbine 15, and a lock-up clutch 16. When the lock-up clutch 16 is engaged, an input shaft and an output shaft of the torque converter 9 are brought into a directly-connected state, and the input shaft and the output shaft are rotated at the same speed. Hereinafter, the lock-up clutch 16 will also be called as the LU clutch 16.

The variator 11 includes a primary pulley 11A, a secondary pulley 11B, and a belt 12. In the variator 11, by controlling oil pressure supplied to the primary pulley 11A and oil pressure supplied to the secondary pulley 11B, contact radiuses between the pulleys 11A, 11B and the belt 12 are changed, and thereby, a speed ratio is changed.

The forward clutch 10 is arranged between the torque converter 9 and the primary pulley 11A. When the forward clutch 10 is engaged, rotation torque of the engine 1 is transmitted to the primary pulley 11A via drive shafts 17, 18. Engagement and disengagement of the forward clutch 10 are switched by the controller 100 in accordance with a driving state.

In FIG. 1, the forward clutch 10 is arranged between the torque converter 9 and the primary pulley 11A. However, the present invention is not limited to this. A purpose of providing the forward clutch 10 is to disconnect a power transmission route between the engine 1 and the drive wheel 8. Thus, for example, the forward clutch 10 may be arranged between the secondary pulley 11B and the final gear device 13.

The MG 3 is connected to a rotation shaft of the primary pulley 11A via a transmission mechanism 20 including a belt and a pulley. The MG 3 is a synchronizing rotary electric machine in which a permanent magnet is embedded in a rotor and a stator coil is wound around a stator. The MG 3 is controlled by applying a three-phase alternating current created by an inverter 4 on the basis of a command from the controller 100. The MG 3 can be operated as an electric motor to be driven and rotated upon receiving supply of electric power from a battery 5. The battery 5 is a high voltage battery of, for example, 48 [V]. Therefore, by operating the MG 3 as an electric motor, EV travel can be performed. In a case where the rotor receives rotation energy from the engine 1 or the drive wheel 8, the MG 3 functions as a power generator adapted to generate electromotive power at both ends of the stator coil, so that the battery 5 can be charged. That is, the MG 3 can regenerate motion energy of the vehicle as electric power. Regeneration control is executed at the time of deceleration of the vehicle, etc.

The oil pump 22 is connected to an output shaft of the engine 1 via a transmission mechanism 21 including a belt and a pulley. Rotation of the engine 1 is inputted to the oil pump 22 and the oil pump is driven by utilizing part of motive power of the engine 1. Oil discharged from the oil pump 22 is supplied to a hydraulic control circuit of the vehicle including a shift circuit.

In addition to the oil pump 22, the vehicle also includes the electric oil pump 6. The electric oil pump 6 is controlled by applying a three-phase alternating current created by an inverter 7 on the basis of a command from the controller 100. Therefore, the electric oil pump 6 can be operated even in a case where the engine 1 is stopped. Oil discharged from the electric oil pump 6 is also supplied to the hydraulic control circuit. Therefore, the continuously variable transmission system 2 is controlled on the basis of the oil pressure supplied from at least the oil pump 22 or the electric oil pump 6.

A signal from an engine rotation speed sensor 25 adapted to detect engine rotation speed Ne, a signal from an accelerator pedal opening sensor 23 adapted to detect an accelerator pedal opening APO, and a signal from a brake sensor 24 adapted to detect brake pedal force based on a pressing amount BPR of a brake pedal are inputted to the controller 100. In addition to these signals, detection signals of a sensor adapted to detect rotation speed of the primary pulley 11A, a sensor adapted to detect rotation speed of the secondary pulley 11B, etc. (not shown) are also inputted to the controller 100.

The controller 100 is formed by a microcomputer including a central processing unit (CPU), a read-only memory (ROM), a random access memory (RAM), and an input/output interface (I/O interface). The controller 100 may be formed by plural microcomputers.

In the configuration described above, the motive power generated in the engine 1 is transmitted to the drive wheel 8 via the torque converter 9, the drive shaft 17, the forward clutch 10, the drive shaft 18, the variator 11, a drive shaft 19, and the final gear device 13. Motive power generated in the MG 3 is transmitted to the drive wheel 8 via the variator 11, the drive shaft 19, and the final gear device 13.

The controller 100 switches between an engine travel mode in which the vehicle travels by the motive power of the engine 1 and an EV travel mode in which the vehicle travels by the motive power of the MG 3 in accordance with the driving state. The controller 100 engages the forward clutch 10 in the engine travel mode, and disengages the forward clutch 10 in the EV travel mode. In a case where a higher output is required at the time of starting the vehicle, merging into a highway, etc., a hybrid travel mode in which the motive power of the engine 1 and the motive power of the MG 3 are used may be executed.

Next, control in a case where an accelerator is turned off during travel in which the accelerator pedal opening is low in the engine travel mode will be described. The low accelerator pedal opening indicates an opening which is approximately one eighth of a fully opened state.

The controller 100 stops the engine 1 during coasting travel (during deceleration) after turn-off of the accelerator. The controller 100 also performs regeneration by the MG 3 during the coasting travel after the turn-off of the accelerator.

At this time, when the engine 1 is stopped in a state where the forward clutch 10 is engaged, torque of the drive shafts 17 to 19 is largely varied, giving an uncomfortable feeling to a driver. Meanwhile, when the forward clutch 10 is disengaged, power transmission from the engine 1 is blocked, and torque variation occurs.

At the time of stopping the engine, for a measure to handle exhaust, the controller 100 properly corrects an oxygen storage amount in an exhaust catalyst by maintaining the engine rotation speed at predetermined rotation speed (for example, idle rotation speed) as described above, and then stops the engine. In the following description, a period to maintain the predetermined rotation speed described above will be called the "maintaining period".

Figure 2:
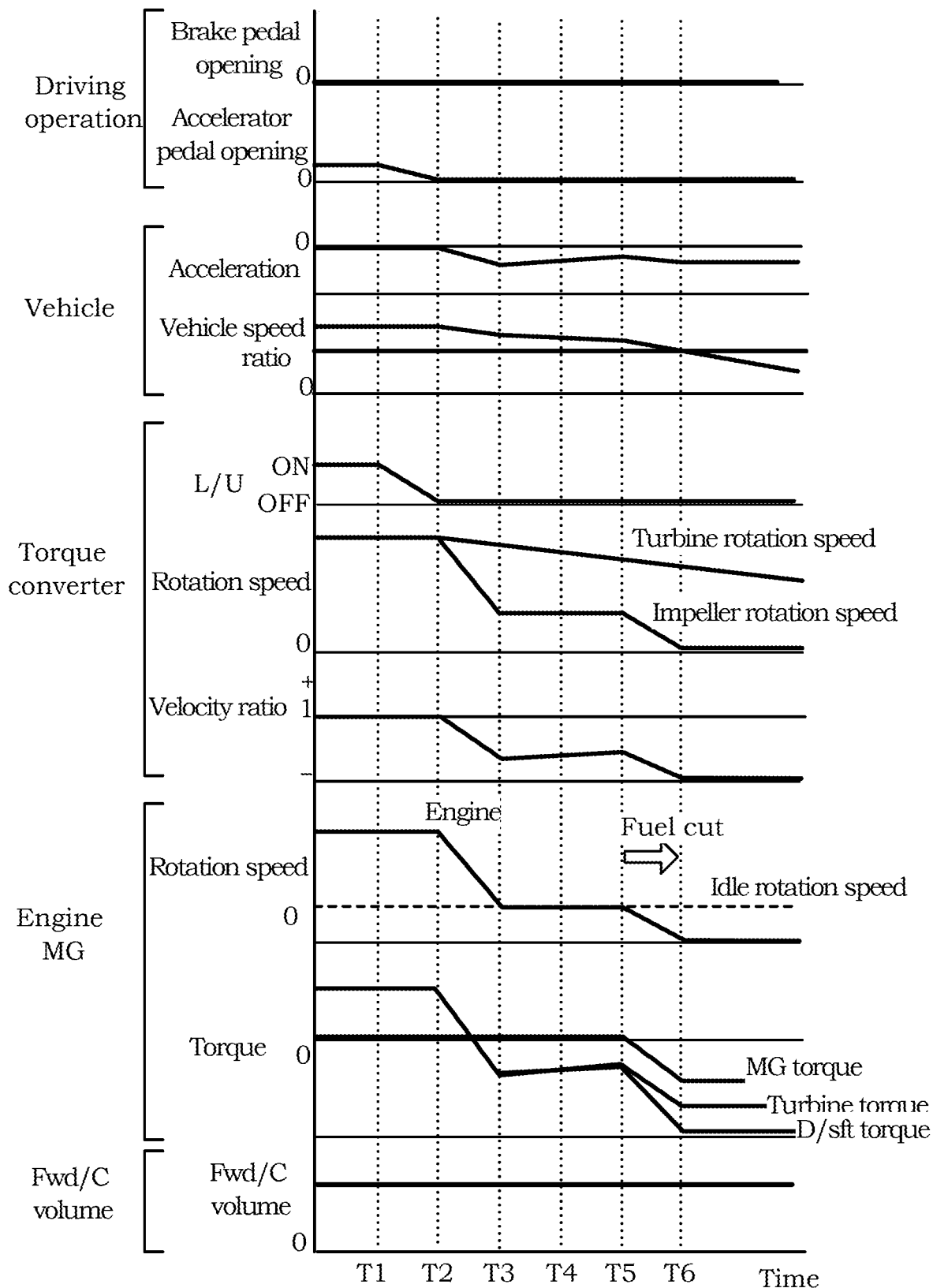
FIG. 2 is a timing chart showing an example of control during deceleration in an engine travel mode.

FIG. 2 is a timing chart for explaining an example of control in a case where the engine is stopped while the forward clutch 10 is engaged. The present control example is not included in the embodiment of the present invention.

A period from timing 0 to timing T1 is in the engine travel mode in which the vehicle travels at fixed vehicle speed with the approximately-one-eighth accelerator pedal opening. At this time, the LU clutch 16 is in an engaged state (ON).

At the timing T1, a decrease in the accelerator pedal opening APO is started, and in association with this, disengagement of the LU clutch 16 is started.

At timing T2, the accelerator pedal opening APO becomes zero, the LU clutch 16 is brought into a disengaged state (OFF), and a decrease in the vehicle speed and the engine rotation speed is started. In association with this, a decrease in turbine rotation speed and impeller rotation speed is also started.

Since the turbine 15 is taken along rotation of the drive wheel 8, the turbine rotation speed is decreased in proportion to the vehicle speed. Meanwhile, since the LU clutch 16 is disengaged, the impeller rotation speed is decreased in proportion to the engine rotation speed. Therefore, decreasing speed of the impeller rotation speed becomes higher than decreasing speed of the turbine rotation speed, and a velocity ratio between the turbine 15 and the impeller 14 becomes negative. In association with a decrease in the engine rotation speed, turbine torque is also decreased.

When the engine rotation speed reaches the idle rotation speed at timing T3, the idle rotation speed is maintained for the measure to handle the exhaust described above by timing T5. At the timing T5, fuel supply to the engine 1 is stopped, and at the same time, the MG 3 generates negative torque, that is, starts regeneration. The torque of the MG 3 is gradually decreased (becomes larger in the negative direction) by timing T6 when the engine 1 is stopped.

D/sft torque of FIG. 2 is torque transmitted to the drive wheel 8. As shown in FIG. 2, this D/sft torque is decreased in association with the turn-off of the accelerator at the timing T2, and further decreased in association with start of the regeneration of the MG 3 at the timing T5 after the period in which the idle rotation speed is maintained. The driver is likely to accept torque variation in association with his/her operation but experience an uncomfortable feeling upon torque variation occurring when he/she does not perform any operation. That is, the driver is likely to accept a torque decrease from the timing T2 to the timing T3 in association with the turn-off of the accelerator but experience an uncomfortable feeling upon a torque decrease at the timing T5 or later.

Thus, in the present embodiment, in order to reduce the uncomfortable feeling described above, the controller 100 executes a control routine to be described next.

Figure 3:
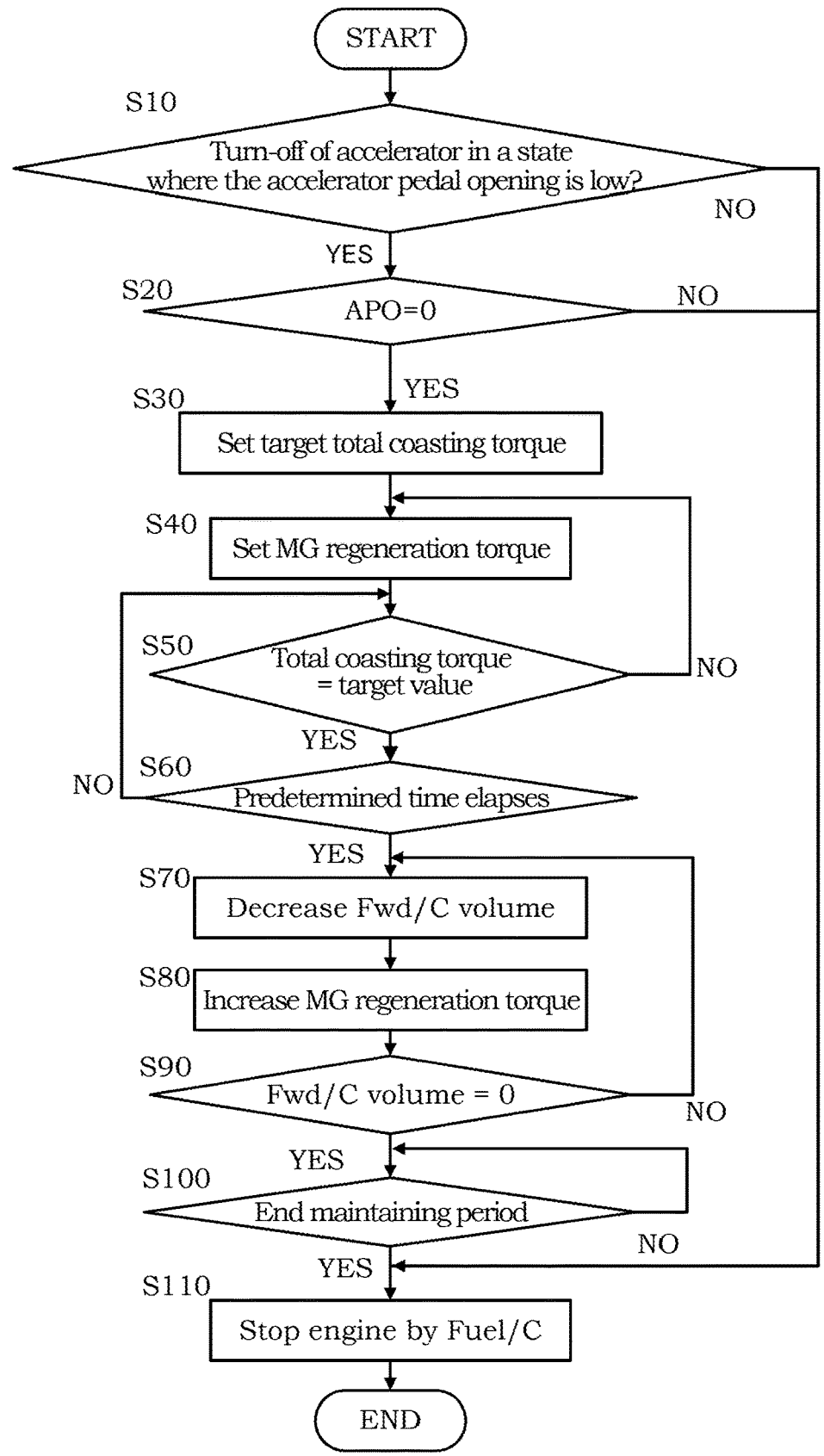
FIG. 3 is a flowchart showing a control routine according to the present embodiment.

FIG. 3 is a flowchart showing the control routine to be executed by the controller 100. The control routine is executed during the engine travel mode.

In Step S10, the controller 100 determines whether or not the accelerator is turned off in a state where the accelerator pedal opening is low. In a case where the accelerator is turned off in a state where the accelerator pedal opening is low, the controller 100 executes processing of Step S20. If this is not the case, the present routine is ended.

In a case where the accelerator is turned off, the LU clutch 16 is disengaged by a control routine to be executed by the controller 100 in parallel with the present control routine.

In Step S20, the controller 100 determines whether or not the accelerator pedal opening is zero. In a case of zero, processing of Step S30 is executed. If this is not the case, the present routine is ended.

Figure 4:
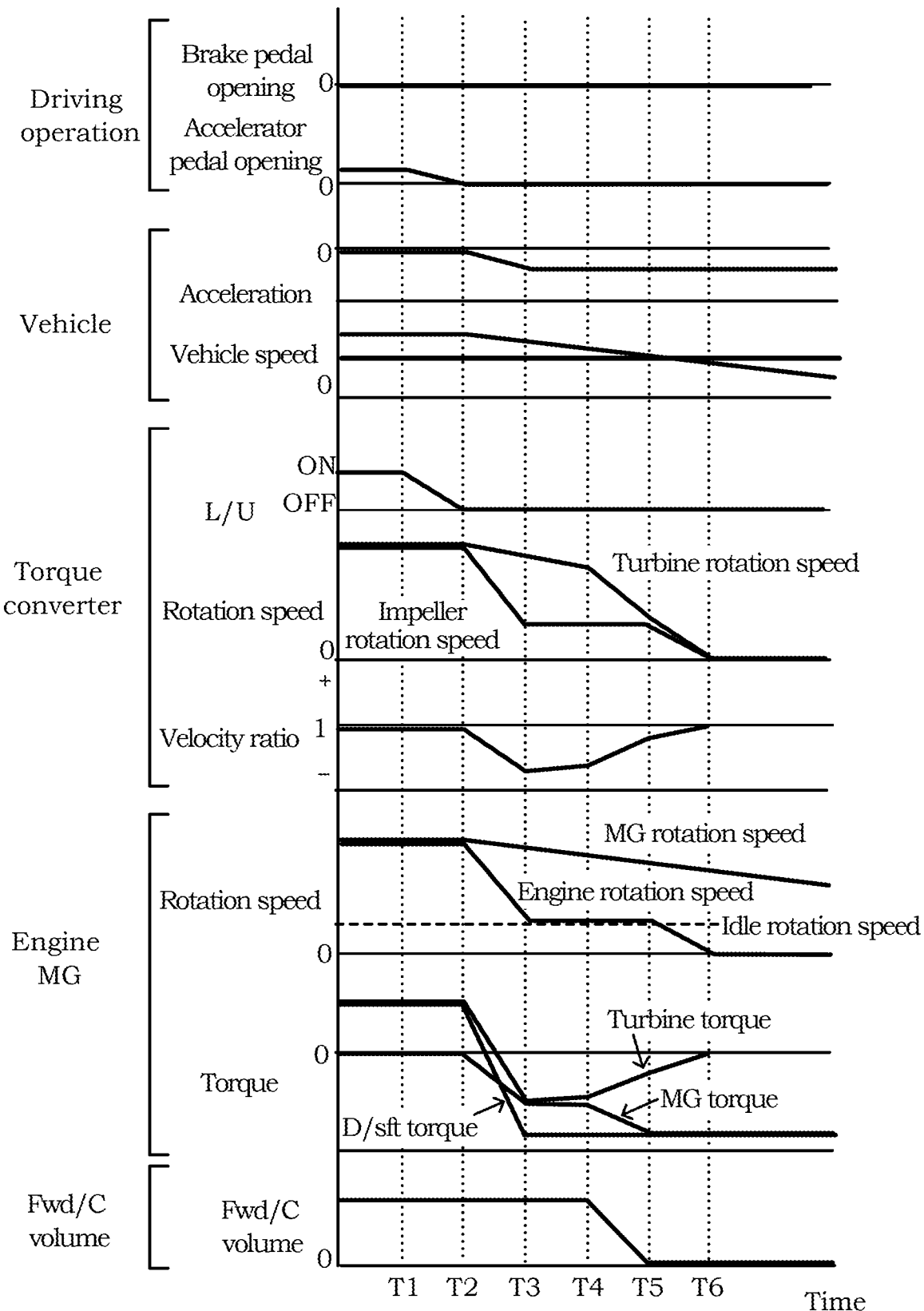
FIG. 4 is a timing chart of a case where the control routine of FIG. 3 is executed.

In Step S30, the controller 100 sets a target total coasting torque. Total coasting torque is torque obtained by adding the torque of the turbine (turbine torque) of the torque converter 9 at the time of the coasting travel, and the regeneration torque of the MG 3 (MG torque) at the time of the coasting travel. In other words, the total coasting torque is torque transmitted to the drive wheel 8 at the time of the coasting travel. The target total coasting torque is a target value of the total coasting torque. In FIG. 4 to be described later, the D/sft torque is the total coasting torque.

The controller 100 sets the target total coasting torque in accordance with a target power generation amount by the regeneration during the coasting travel. The target power generation amount is fixed on the basis of a state of charge (SOC) of the battery 5, etc. The smaller the SOC of the battery 5 is, the larger the target power generation amount becomes. The larger the SOC of the battery 5 is, that is, the closer the SOC is to a fully charged state, the smaller the target power generation amount becomes. The larger the target power generation amount is, the larger the regeneration torque of the MG 3 becomes as well. The regeneration torque of the MG 3 acts on the drive wheel 8 as negative torque. Thus, the larger the target power generation amount is, the larger the regeneration torque becomes and the smaller the target total coasting torque becomes.

When the torque at the time of power running of the MG 3 is positive, the regeneration torque is negative torque. Therefore, the phrase "the regeneration torque becomes larger" means that the torque generated by the MG 3 becomes smaller.

In Step S40, the controller 100 sets the regeneration torque of the MG 3. Specifically, the regeneration torque is set so that the total coasting torque reaches the target total coasting torque at timing when the engine rotation speed reaches the idle rotation speed, in other words, at timing of starting the maintaining period. That is, the regeneration torque to be set in this step is gradually increased in association with the decrease in the engine rotation speed.

In Step S50, the controller 100 determines whether or not current total coasting torque is decreased to the target total coasting torque. In a case where the current total coasting torque is decreased, processing of Step S60 is executed. In a case where the current total coasting torque is not decreased, Steps S40, S50 are repeatedly executed.

In Step S60, the controller 100 determines whether or not a predetermined time elapses after the total coasting torque reaches the target total coasting torque. When the predetermined time elapses, processing of Step S70 is executed. When the predetermined time does not yet elapse, the flow is returned to the processing of Step S50. The "predetermined time" is a time which is set in advance, and fixed on the basis of length of the maintaining period and a time required before an engagement volume of the forward clutch 10 becomes zero. More specifically, the predetermined time is determined by subtracting the time required before the engagement volume of the forward clutch 10 becomes zero from the maintaining period.

In Step S70, the controller 100 starts decreasing the engagement volume of the forward clutch 10. By setting the predetermined time as described above, the engagement volume of the forward clutch 10 becomes zero at timing of ending the maintaining period.

In Step S80, the controller 100 increases the regeneration torque of the MG 3 in accordance with a decrease in the engagement volume of the forward clutch 10 so that the total coasting torque is not changed. That is, when the engagement volume of the forward clutch 10 is decreased, the turbine torque transmitted to the drive wheel 8 becomes smaller. Thus, in order to suppress a change in the total coasting torque, the regeneration torque of the MG 3 is increased.

In Step S90, the controller 100 determines whether or not the engagement volume of the forward clutch 10 becomes zero. When the engagement volume becomes zero, processing of Step S100 is executed. When the engagement volume does not yet become zero, the processing of Steps S70, S80 are repeatedly executed.

In Step S100, the controller 100 determines whether or not the maintaining period is ended. When the maintaining period is ended, processing of Step S110 is executed.

In Step S110, the controller 100 stops the fuel supply to the engine 1 to stop the engine 1. The "Fuel/C" in the figure is an abbreviation of "Fuel Cut", that is, fuel supply stoppage.

Next, actions and effects in a case where the above control routine is executed will be described.

FIG. 4 is a timing chart of a case where the above control routine is executed. The "MG torque" in the figure is the torque generated by the MG 3. That is, when the regeneration torque becomes larger, the MG torque in the figure becomes smaller.

When the accelerator is turned off at timing T1 and the accelerator pedal opening becomes zero at timing T2, an increase in the regeneration torque of the MG 3 is started, and at timing T3 when the engine rotation speed becomes the idle rotation speed, the total coasting torque becomes the target total coasting torque (Steps S10 to S50).

At the timing T3 or later, that is, after the maintaining period is started, the regeneration torque of the MG 3 is changed in accordance with a change in the turbine torque so that the total coasting torque is not brought out of the target total coasting torque before the predetermined time elapses (Steps S30 to S50). The turbine torque is changed during a period from the timing T3 to timing T4 because, by maintaining the engine rotation speed at the idle rotation speed, the impeller rotation speed becomes fixed whereas the turbine rotation speed is decreased in proportion to the vehicle speed.

At the timing T4 when the predetermined time elapses, the decrease in the engagement volume of the forward clutch 10 is started, and in accordance with this, the regeneration torque of the MG 3 is increased so that the total coasting torque is not brought out of the target total coasting torque (Steps S70 to S80).

At timing T5 when the engagement volume of the forward clutch 10 becomes zero, the fuel supply to the engine 1 is stopped, and the engine 1 is stopped at timing T6 (Steps S90 to S110).

According to the above control routine, the total coasting torque becomes the target total coasting torque at the timing of starting the maintaining period, and maintained at the target total coasting torque during the maintaining period. Since the engine 1 is stopped after the forward clutch 10 is disengaged, the total coasting torque is not varied in association with engine stoppage.

A change in the torque in association with the turn-off of the accelerator is anticipated by the driver. That is, a change in the total coasting torque from the timing T2 to the timing T3 does not give an uncomfortable feeling to the driver.

As in FIG. 2, a change in the torque during the maintaining period and a change in the torque in association with the engine stoppage give an uncomfortable feeling to the driver. However, in the present embodiment, the total coasting torque is maintained and fixed from start of the maintaining period to the engine stoppage as described above. Thus, it is possible to suppress an uncomfortable feeling given to the driver.

As described above, according to the present embodiment, a control device for a vehicle having the drive shaft 18, the forward clutch 10 (engagement element), the engine 1 connected to the drive shaft 18 via the forward clutch 10, and the MG 3 (electric motor) connected to the drive shaft 18 not via the forward clutch 10 is provided. This control device has the controller 100 (control portion) adapted to stop the engine 1 after the maintaining period in which the engine 1 is maintained at the predetermined rotation speed during travel of the vehicle. The controller 100 gradually decreases the engagement volume of the forward clutch 10 while gradually increasing the regeneration torque (power generation load) of the MG 3 during the maintaining period to disengage the forward clutch 10, and stops the engine 1 after the disengagement of the forward clutch 10.

Thereby, a gradually decreased amount of an engine load due to a gradual decrease in the engagement volume of the forward clutch 10 is supplemented by a gradually increased amount of the regeneration torque of the MG 3. Thus, it is possible to disengage the forward clutch 10 while suppressing variation of the total coasting torque. By stopping the engine after the disengagement of the forward clutch 10, it is also possible to suppress the variation of the total coasting torque in association with the engine stoppage. Therefore, when the coasting travel in association with the regeneration is started at the time of deceleration during execution of the engine travel mode, it is possible to suppress torque variation which gives an uncomfortable feeling to the driver.

An absolute value of inclination of the gradual decrease in the engagement volume of the forward clutch 10 is preferably equal to an absolute value of inclination of a gradual increase in the regeneration torque of the MG 3.

The configuration in which the MG 3 is connected to the drive shaft 18 is described above. However, the shaft to which the MG 3 is connected is any shaft placed in the power transmission route on the downstream side (drive wheel side) of the forward clutch 10. For example, the shaft may be the drive shaft 19 connecting the secondary pulley 11B and the final gear device 13, or may be a drive shaft connecting the final gear device 13 and the drive wheel 8.

In the present embodiment, the controller 100 increases the regeneration torque of the MG 3 at the same time as start of the decrease in the rotation speed of the engine 1 before the maintaining period. That is, the regeneration torque is increased from the timing T2 to the timing T3 of FIG. 4. Thereby, the regeneration torque is increased at two stages including a stage from the timing T2 to the timing T3 and a stage from the timing T4 to the timing T5. As a result, in comparison to a case where the regeneration torque is maintained to be zero by the timing T5, it is possible to increase the regeneration torque at the timing T5 or later. That is, it is possible to increase a regeneration amount by the MG 3 more.

By increasing the regeneration torque, decreasing speed of the total coasting torque from the timing T2 to the timing T3 is higher than a case where the regeneration torque is not increased. However, a decrease in the total coasting torque in association with the turn-off of the accelerator is anticipated by the driver. Thus, this higher decreasing speed gives a less uncomfortable feeling to the driver than a case where the total coasting torque is varied during the maintaining period.

The embodiment of the present invention is described above. However, the above embodiment only shows part of application examples of the present invention and does not intend to limit the technical scope of the present invention to the specific configurations of the above embodiment.

This application claims priority based on Japanese Patent Application No. 2017-152497 filed with the Japan Patent Office on Aug. 7, 2017, the entire contents of which are incorporated into this specification.

The invention claimed is:

1. A control device for a vehicle having:
a drive shaft;
an engagement element;
an engine connected to the drive shaft via the engagement element; and
an electric motor connected to the drive shaft not via the engagement element,
the control device comprising:
a controller configured to stop the engine after a maintaining period in which the engine is maintained at predetermined rotation speed during travel of the vehicle, wherein
the controller gradually decreases an engagement volume of the engagement element while gradually increasing a power generation load of the electric motor during the maintaining period to disengage the engagement element, and stops the engine after disengagement of the engagement element.

2. The control device for the vehicle according to claim 1, wherein
the controller increases the power generation load of the electric motor at the same time as start of a decrease in the rotation speed of the engine before the maintaining period.

3. A control method for a vehicle having:
a drive shaft;
an engagement element;
an engine connected to the drive shaft via the engagement element; and
an electric motor connected to the drive shaft not via the engagement element,
the control method comprising:
during travel of the vehicle, stopping the engine after a maintaining period in which the engine is maintained at predetermined rotation speed; and
gradually decreasing an engagement volume of the engagement element while gradually increasing a power generation load of the electric motor during the maintaining period to disengage the engagement element, and stopping the engine after disengagement of the engagement element.

4. A control device for a vehicle having:
a drive shaft;
an engagement element;
an engine connected to the drive shaft via the engagement element; and
an electric motor connected to the drive shaft not via the engagement element,
the control device comprising:
control means for stopping the engine after a maintaining period in which the engine is maintained at predetermined rotation speed during travel of the vehicle, wherein
the control means gradually decreases an engagement volume of the engagement element while gradually increasing a power generation load of the electric motor during the maintaining period to disengage the engagement element, and stops the engine after disengagement of the engagement element.

* * * * *